3,025,308
17-OXYGENATED 16-HALOESTR-5(10)-ENES

William F. Johns, Morton Grove, and George P. Mueller, Park Ridge, Ill., assignors to G. D. Searle & Co., Chicago, Ill., a corporation of Delaware
No Drawing. Filed Oct. 12, 1959, Ser. No. 845,656
10 Claims. (Cl. 260—397.3)

The present invention relates to compounds possessing the steroid ring structure which are halogenated in the 16-position and more specifically to 17-oxygenated 16-haloestr-5(10)-enes of the structural formula

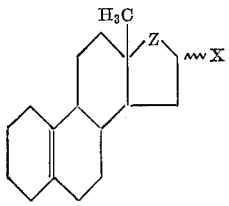

wherein X is a halo radical and Z is selected from the group consisting of hydroxymethylene (lower alkanoyloxy)methylene, and carbonyl radicals. Among the lower alkanoyl radicals encompassed by Z are formyl, acetyl, propionyl, butyryl, valeryl, caproyl, enanthyl, caprylyl, and branched-chain isomers thereof, said alkanoyl radicals being the acyl radicals of aliphatic carboxylic acids containing less than nine carbon atoms.

This application is a continuation-in-part of my copending application, Serial Number 797,041, filed March 4, 1959; and now abandoned.

The 16-halo compounds disclosed in the instant application can exist in two stereoisomeric forms depending upon the configuration of the halogen atom with respect to the ring. These two stereoisomers, designated "α" and "β," can be prepared by dissimilar stereoselective processes.

The 16α-chloro-, 16α-bromo-, and 16α-iodoestr-5(10)-en-17-ones of the present invention can be prepared by treating an appropriate 17-(lower alkanoyloxy)estra-5(10),16-diene with the desired halogen in an inert solvent such as carbon tetrachloride, destroying the excess halogen, and isolating the product. As a specific example, 17-acetoxyestra-5(10),16-diene is treated with chlorine in carbon tetrachloride solution, sodium thiosulfate added to destroy the excess chlorine, and the product isolated to afford 16α-chloroestr-5(10)-en-17-one.

A preferred method for obtaining 16α-iodoestr-5(10)-en-17-one, specifically, comprises treating a 17-(lower alkanoyloxy)estra-5(10),16-diene in acetic acid with iodine in the presence of mercuric acetate. For example, treatment of 17-acetoxyestra-5(10),16-diene with iodine and mercuric acetate in acetic acid results in 16α-iodoestr-5(10)-en-17-one.

The 16β-chloro- and 16β-bromoestr-5(10)-en-17-ones, on the other hand, can be prepared by treating 16α-iodoestr-5(10)-en-17-one with the appropriate lithium halide. For example, 16α-iodoestr-5(10)-en-17-one in dimethylformamide is treated with lithium chloride to yield 16β-chloroestr-5(10)-en-17-one.

The 17-(lower alkanoyloxy)estra-5(10),16-dienes are again starting materials for the preparation of 16β-iodoestr-5(10)-en-17-one. As a specific example, 17-acetoxyestra-5(10),16-diene is treated with N-iodosuccinimide in dioxane and the product isolated to afford 16β-iodoestr-5(10)-en-17-one.

16β-fluoroestr-5(10)-en-17-one can be prepared by treating the corresponding 16α-iodo compound with silver fluoride in a polar solvent such as acetonitrile. The product is isolated from the filtrate after removal of the silver salts by filtration. Epimerization of the 16β-fluoro isomer by treatment of the latter with an aqueous solution of potassium hydroxide in methanol results in 16α-fluoroestr-5(10)-en-17-one.

The intermediate 17-(lower alkanoyloxy)estra-5(10),16-dienes can be prepared by treating estr-5(10)-en-17-one with the appropriate alkanoyl anhydride in the presence of p-toluenesulfonic acid. A particularly suitable intermediate, also a compound of this invention, is prepared by treating estr-5(10)-en-17-one (Belgian Patent 566,297, pp. 12–13; March 31, 1958) with isopropenyl acetate in the presence of p-toluenesulfonic acid to afford 17-acetoxyestra-5(10),16-diene.

The 16-haloestr-5(10)-en-17-ols of the present invention can be prepared by treating the corresponding 16-haloestr-5(10)-en-17-one with a reducing agent such as lithium aluminum hydride or sodium borohydride. For example, 16-bromoestr-5(10)-en-17-one in tetrahydrofuran is treated with lithium aluminum hydride and the excess hydride destroyed to afford 16-bromoestr-5(10)-en-17-ol.

The 17-(lower alkanoyloxy)-16-haloestr-5(10)-enes can be obtained from the 16-haloestr-5(10)-en-17-ols by esterification with the appropriate lower alkanoic acid anhydride.

The compounds of the present invention are useful because of their valuable pharmacological properties. They have, for example, the capacity to decrease the serum concentration of cholesterol and the corresponding chloesterol:phospholipid ratio without at the same time producing the potent estrogenic side-effects characteristic of prior art compositions adapted to regulation of cholesterol metabolism.

As is demonstrated supra, 17-acetoxyestra-5(10),16-diene of the present invention is useful also by virtue of its function as an intermediate in the preparation of the instant 17-oxygenated 16α-haloestr-5(10)-enes.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples temperatures are given in degrees centigrade (° C.). Quantities of materials are expressed in parts by weight except where otherwise noted.

EXAMPLE 1

17-Acetoxyestra-5(10),16-Diene

A solution of 3.4 parts of estr-5(10)-en-17-one and 2 parts of p-toluenesulfonic acid in 200 parts of isopropenyl acetate is distilled slowly for 20 hours. The cooled reaction mixture is diluted with ether and the resultant mixture washed with aqueous potassium bicarbonate solution, dried over anhydrous magnesium sulfate, and evaporated to dryness in vacuo. The residue is dissolved in petroleum ether and the resultant solution treated with 40 parts of fuller's earth. The crude product obtained by evaporation of the petroleum ether is crystallized from an ether-methanol solution to afford 17-acetoxyestra-5(10),16-diene, M.P. 117–120°.

EXAMPLE 2

16α-Chloroestr-5(10)-en-17-one

To a vigorously stirred solution of 0.98 part of 17-acetoxyestra-5(10),16-diene in 64 parts of carbon tetrachloride at 10°, is added 10 parts of anhydrous potassium carbonate followed by 1.4 equivalents of chlorine dissolved in carbon tetrachloride. The excess chlorine is destroyed by the addition of an aqueous sodium thiosulfate solution and the mixture extracted with methylene chloride. The extract is washed with water, dried over anhydrous magnesium sulfate, and evaporated to dryness in vacuo. The residue is purified by chromatography on silica gel resulting in pure 16α-chloroestr-5(10)-en-17-one, M.P. 120–123°; which possesses a maximum in the infrared at about 5.71 microns.

By substituting an equivalent quantity of bromine or iodine and otherwise proceeding according to the herein described processes, 16α-bromoestr-5(10)-en-17-one, M.P. 151–153°, and 16α-iodoestr-5(10)-en-17-one are obtained. Each of the latter compounds exhibits a maximum in the infrared at about 5.71 microns.

EXAMPLE 3

16α-Iodoestr-5(10)-en-17-one

To a solution of 2 parts of 17-acetoxyestra-5(10),16-diene and 1.1 parts of mercuric acetate in 75 parts of acetic acid is added at 15°, with stirring, a solution of 2 parts of iodine in 300 parts of acetic acid. Stirring is continued for 15 minutes and the mixture poured into excess aqueous potassium iodide. The resulting mixture is extracted with benzene and the benzene extract washed successively with aqueous sodium thiosulfate, water, and aqueous potassium bicarbonate. The solution is first dried over anhydrous magnesium sulfate, then evaporated to dryness in vacuo. Crystallization from methanol affords 16α-iodoestr-5(10)-en-17-one which exhibits a maximum in the infrared at 5.71 microns.

EXAMPLE 4

16β-Fluoroestr-5(10)-en-17-one

A solution of 2 parts of 16α-iodoestr-5(10)-en-17-one in 100 parts of acetonitrile is heated at reflux for 24 hours in a Soxhlet apparatus containing 12 parts of silver fluoride. The cooled mixture is filtered to remove the silver salts and the filtrate diluted with chloroform. The chloroform solution is washed with water, dried over anhydrous magnesium sulfate, and evaporated to dryness in vacuo. The residue is chromatographed on silica gel and eluted with a 75% benzene–25% petroleum ether solution. Final purification is effected by recrystallization from a benzene-petroleum ether solution to yield 16β-fluoroestr-5(10)-en-17-one whose infrared spectrum possesses a maximum at about 5.68 microns.

EXAMPLE 5

16α-Fluoroestr-5(10)-en-17-one

To a solution of 2.4 parts of 16β-fluoroestr-5(10)-en-17-one in 400 parts of methanol is added 20 parts of 10 N aqueous potassium hydroxide, and the mixture heated at reflux for about 20 minutes. This reaction mixture is cooled, diluted with water, and extracted with benzene. The benzene layer is washed with water, dried over anhydrous magnesium sulfate, and concentrated to dryness in vacuo. The residue is purified by chromatography on silica gel followed by recrystallization from an acetone-petroleum ether solution to afford 16α-fluoroestr-5(10)-en-17-one. It possesses a maximum in the infrared at 5.68 microns.

EXAMPLE 6

16α-Chloroestr-5(10)-en-17-ol

To a slurry of 3 parts of lithium aluminum hydride with 350 parts of diethyl ether is added a solution of 6 parts of 16α-chloroestr-5(10)-en-17-one in 350 parts of diethyl ether. The mixture is stirred at room temperature for 10 minutes, then treated successively with water and dilute hydrochloric acid to destroy the excess hydride. The resultant mixture is extracted with benzene, and the benzene extract dried over anhydrous magnesium sulfate and evaporated to dryness in vacuo. The residue is chromatographed on fuller's earth and the two isomers, 16α-chloroestr-5(10)-en-17α-ol and 16α-chloroestr-5(10)-en-17β-ol (M.P. 91–93°), are obtained by successive elutions of the column. Each of these isomers exhibits maxima in its infrared spectrum at about 3.01 and 9.48 microns.

By substituting an equivalent quantity of 16α-bromoestr-5(10)-en-17-one, 16α-iodoestr-5(10)-en-17-one, or 16α-fluoroestr-5(10)-en-17-one, and otherwise proceeding according to the herein described processes, 16α-bromoestr-5(10)-en-17α-ol, 16α-bromoestr-5(10)-en-17β-ol, 16α-iodoestr-5(10)-en-17α-ol, 16α-iodoestr-5(10)-en-17β-ol, 16α-fluoroestr-5(10)-en-17α-ol, and 16α-fluoroestr-5(10)-en-17β-ol are obtained.

EXAMPLE 7

16β-Chloroestr-5(10)-en-17-one

To a solution of 6 parts of 16α-iodoestr-5(10)-en-17-one in 250 parts of dimethylformamide is added 20 parts of lithium chloride and the mixture stirred for 6 hours. The mixture is diluted with water and the precipitated product collected by filtration. Recrystallization of the precipitate from methanol yields 16β-chloroestr-5(10)-en-17-one. This substance exhibits a maximum in its infrared spectrum at about 5.71 microns.

By substituting an equivalent quantity of lithium bromide, and otherwise proceeding according to the herein described processes, 16β-bromoestr-5(10)-en-17-one is obtained.

EXAMPLE 8

16β-Iodoestr-5(10)-en-17-one

A mixture of 6.5 parts of 17-acetoxyestra-5(10),16-diene, 5 parts of N-iodosuccinimide, and 12 parts of dioxane is heated, under an atmosphere of nitrogen, at 80° for 2 hours. The cooled reaction mixture is diluted with methanol, then poured into excess aqueous potassium iodide. The mixture is treated with aqueous sodium thiosulfate, cooled in an ice-bath, and filtered to remove the crude product. Purification of the crude product by chromatography on silica gel and elution with a 50% benzene–50% petroleum ether solution followed by recrystallization from methanol yields 16β-iodestr 5(10)-en-17-one. It exhibits a maximum in the infrared at 5.71 microns.

EXAMPLE 9

17β-Acetoxy-16α-chloroestr-5(10)-ene

A mixture of 5 parts of 16α-chloroestr-5(10)-en-17β-ol with 100 parts of pyridine and 55 parts of acetic anhydride is heated on the steam bath for 20 minutes. The cooled mixture is poured into 1200 parts of water and the precipitate collected by filtration. The crude product is washed with water and crystallized from aqueous acetone to afford pure 17β-acetoxy-16α-chloroestr-5(10)-ene, which possesses maxima in the infrared at 5.73 and 8.05 microns.

By substituting an equivalent quantity of 16α-chloroestr-5(10)-en-17α-ol and otherwise proceeding according to the herein described processes, 17α-acetoxy-16α-chloroestr-5(10)-ene is obtained.

EXAMPLE 10

16α-Bromo-17β-propionoxyestr-5(10)-ene

A mixture of one part of 16α-bromoestr-5(10)-en-17β-ol, 20 parts of pyridine, and 13 parts of propionic anhydride is heated on the steam bath for about one hour. The reaction mixture is "worked up" according to the process of Example 9 to afford 16α-bromo-17β-propionoxyestr-5(10)-ene.

The substitution of an equivalent quantity of 16α-iodoestr-5(10)-en-17α-ol in the instant process results in 16α-iodo-17α-propionoxyestr-5(10)-ene.

What is claimed is:
1. A compound of the structural formula

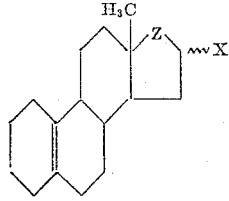

wherein X is a halo radical and Z is selected from the group consisting of hydroxymethylene (lower alkanoyl) oxy-methylene, and carbonyl radicals.
2. 16-chloroestr-5(10)-en-17-one.
3. 16-bromoestr-5(10)-en-17-one.
4. 16-iodoestr-5(10)-en-17-one.
5. 16-fluoroestr-5(10)-en-17-one.
6. 16α-chloroestr-5(10)-en-17-ol.
7. 16α-bromoestr-5(10)-en-17-ol.
8. 16α-iodoestr-5(10)-en-17-ol.
9. 16α-fluoroestr-5(10)-en-17-ol.
10. 17-acetoxyestr-5(10),16-diene.

No references cited.